United States Patent [19]

Bremer et al.

[11] Patent Number: 4,645,871
[45] Date of Patent: Feb. 24, 1987

[54] NON-INTERFERING IN-BAND PROTOCOL-INDEPENDENT DIAGNOSTIC SCANNING IN A DIGITAL MULTIPOINT COMMUNICATION SYSTEM

[75] Inventors: Gordon Bremer; Thomas Armstrong, both of Clearwater; Kurt Holmquist, Largo; Richard K. Smith, Seminole, all of Fla.

[73] Assignee: Paradyne Corporation, Largo, Fla.

[21] Appl. No.: 745,849

[22] Filed: Jun. 17, 1985

[51] Int. Cl.⁴ .......................... H04L 9/00; G07D 7/00; G08B 5/22
[52] U.S. Cl. .................................. 380/2; 340/825.34; 340/825.36; 380/24; 380/29
[58] Field of Search .............. 340/506, 825.34, 825.36; 178/22.07

[56] References Cited

U.S. PATENT DOCUMENTS

| | | | |
|---|---|---|---|
| 4,322,576 | 3/1982 | Miller | 178/22.07 |
| 4,375,637 | 3/1983 | Desjardins | 340/506 |
| 4,550,311 | 10/1985 | Galloway et al. | 340/506 |

Primary Examiner—Salvatore Cangialosi
Assistant Examiner—Aaron J. Lewis
Attorney, Agent, or Firm—Kane, Dalsimer, Kane, Sullivan & Kurucz

[57] ABSTRACT

In a system in which data between a master and remote location is encrypted by using the DES algorithm, the status of security devices at the remote location is monitored from a centralized security station. A message indicative of the status of the security devices is used to generate an initializing vector (IV). This IV is then used to encrypt the data from the remote to the master.

1 Claim, 4 Drawing Figures

NON-INTERFERING IN-BAND PROTOCOL-INDEPENDENT DIAGNOSTIC SCANNING IN A DIGITAL MULTIPOINT COMMUNICATION SYSTEM

BACKGROUND OF THE INVENTION a. Field of Invention

This invention pertains to a method of monitoring the status of several remote data transmission equipment locations from a master location using the Data Encryption Standard (DES).

b. Description of the Prior Art

Encryption devices are frequently located within some physically secure enclosure such as a branch bank or an automatic teller machine. Physical security is also necessary merely to restrict access to the plain text data output from the encryption device. If this location is unattended, then it is likely that an alarm system is installed, and the status of the alarms is sent to a central monitoring facility over some exposed transmission medium such as common telephone lines. The lines used for this are generally separate from the lines used for normal data communications. A person wishing to gain unauthorized and undetected access must first defeat the remote alarm reporting system before breaking in. In an unprotected alarm reporting system this may be done simply by intercepting the alarm messages and, if necessary, replacing them with "all is well" messages. Encryption of the status messages in a secret key makes it impossible to use this approach.

The data encryption standard (DES) of the U.S. National Bureau of Standards has been widely adopted for encryption of sensitive data sent over common carrier channels. The standard modes of operation of this encryption algorithm which are suitable for encryption of a serial data stream require transmission of an initialization vector with each frame of data. In a multipoint link, each remote data transmission equipment must precede the transmission of its (encrypted) response to a poll with this initialization vector (IV). The encryption algorithms will work with IV lengths from 0 bits (implicit IV) to 64 bits. Longer IV's give greater protection against certain cryptographic attacks but also increase the overhead imposed on the link by encryption. Federal Telecommunications Standard 1026 specifies the IV length to be 48 bits or greater.

Federal Telecommunications Standard 1026 and the ANSI link encryption standard have established the "handshake" protocol between the DTE, encryptor (DEE), and the DCE when using the cipher feedback mode of the DES. The protocol provides for transmission of the IV so that there is no interference with the link data and so that special programming of the DTE and DCE is not required. Basically this is done by having the DEE hold its CTS (clear to send) signal to the DTE inactive while it is transmitting the IV. At the other end of he link, the receiving DEE removes the IV before turning LSD on and sending the decrypted poll response to the DTE.

OBJECTIVES AND SUMMARY OF THE INVENTION

A principal objective of the present invention is to provide a method of polling the status of a plurality of remote data transmission equipment locations in a secure manner.

Another objective is to provide a polling method which does not require any changes in the data transmission or communication equipment.

Other objectives and advantages of the invention shall become apparent from the following description of he invention.

This invention provides an efficient and cryptographically secure method of continuously monitoring the status of data security (encryption) equipment and its physical surroundings (such as burglar alarms) when used in multi-point data communications networks. In this system (FIG. 1), the "drops" in the network send status reports to a centrally located security monitoring device. Multipoint networks often use polling protocols to maintain line usage discipline. The encryption device, which is between the DTE and DCE at each remote location, transmits an encrypted status frame immediately prior to the encrypted response of the drop to a poll. The cipher text of this status message serves as the initialization vector for the encipherment of the data transmitted by the DTE at this drop thereby minimizing additional overhead for alarm status reporting. At the central location, the encryptor removes this status message from the data stream so that it is not received by the DTE deciphers it and sends it to a central monitoring facility.

DETAILED DESCRIPTION OF THE INVENTION

Figure 1:
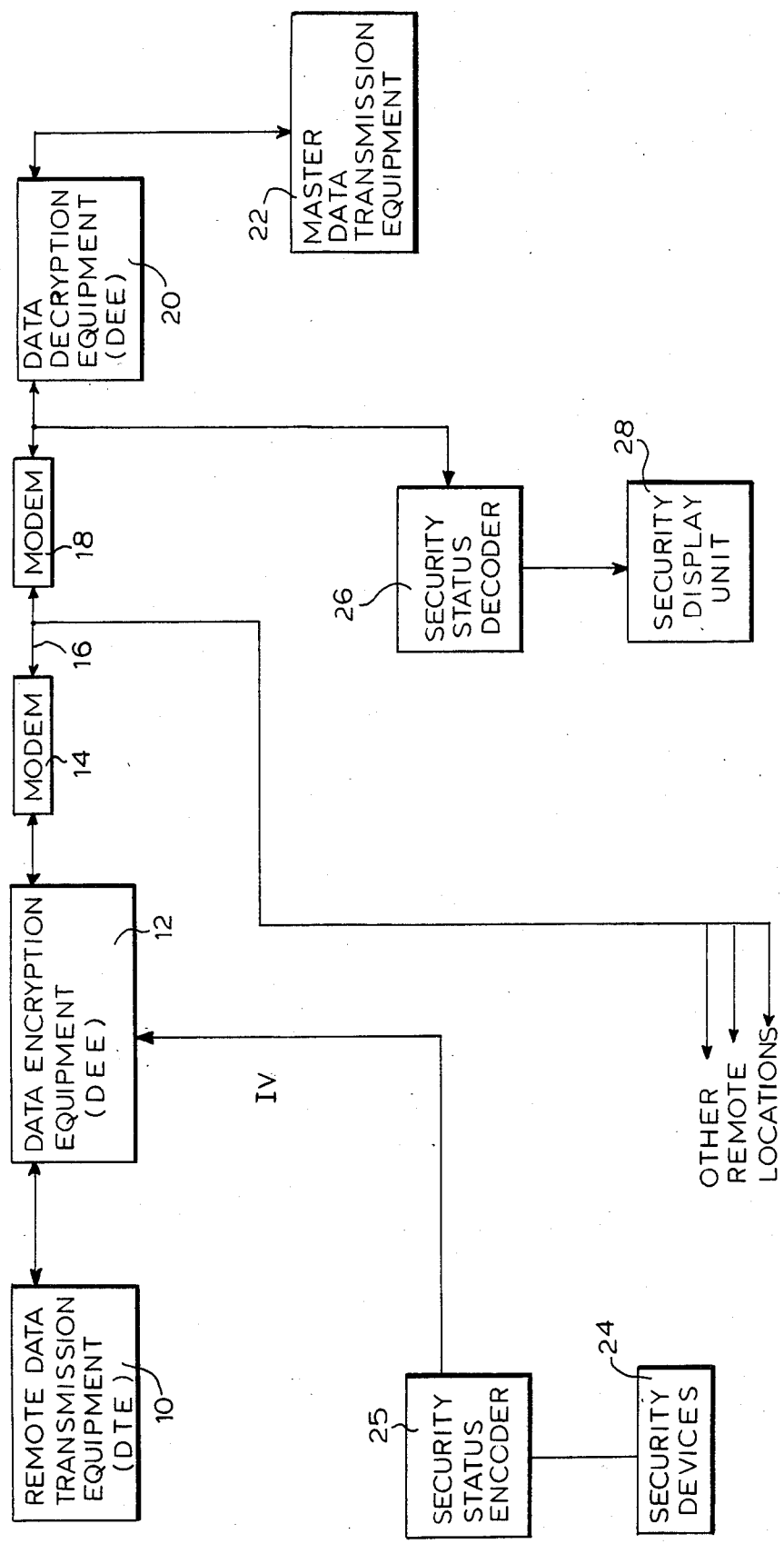
FIG. 1 shows a system for monitoring the status and security of data transmitting equipment locations.

As shown in FIG. 1, in the present invention data from a remote data transmission equipment 10 is transmitted to a data encryption (DEE) equipment 12 which encrypts the data by using the cipher feedback encryption mode of the Data Encryption Standard (DES) described in Federal Information Processing Standard Publication 81. The encrypted data is sent to a modem 14 which encodes the signals by using well known methods in the art into data signals and transmits them over communication channel 16 to master modem 18. The master modem decodes the signals from channel 16, and sends the decoded encrypted data to master data encryption equipment (DEE) 20. The DEE in its turn generates plain text for master DTE 22.

The security of remote DTE 10 is monitored by security device 24 which generates data indicative of its status. This data is used by security encoder 25 to generate an initializing vector (IV). The IV is sent to the DEE at the master location. The data from the security devices contained in the IV is decoded by a security decoder 26 and the status of the devices is then displayed on a security display unit 28. For example, the system of FIG. 1 could comprise a banking system in which DTE 10 is an automatic teller machine, master DTE 22 comprises a centralized banking office and the security device 24 comprises various burglar and fire alarms. In this configuration the security decoder 26 and display circuit 28 are located in a centralized security office.

Typically, the master DTE 22 polls each remote location through channel 16. In response, each remote DTE sends an appropriate message. If DES is used, each message is preceded by an Initializing Vector (IV), in accordance with Federal Standard 1026 (1983) entitled Telecommunications: Interoperability and Security Requirements for Use of the Data Encryption Standard in the Physical Layer of Data Communications and the ANSI link encyption standard.

The statistical properties of the IV must approximate those of a purely random sequence. It should not be possible to anticipate the number used for an IV based on previous IV's and all possible IV values should be equally likely. The ciphertext stream produced by encryption of a continuous stream of data using the DES in the cipher feedback mode has these properties (as does the cipher text from any strong encryption algorithm.)

In this invention the security status messages are encrypted using K-bit cipher feedback and the resulting cipher text is broken up into K-bit blocks where K is the number of bits in the IV. Each K-bit block is then sent at the beginning of a poll response and serves as the IV for the encryption of that response. The key used for encryption of the status messages may or may not be the same key used to encrypt the link data. There are no restrictions on the relationship between the length of the IV and the length of the status message since a complete status message can be sent in segments over several poll responses. If the width of the feedback path used for encryption of status messages is equal to the IV length, this encryption process will be self-synchronizing since the RTS-LSD transitions with each frame serve to delimit the K-bit blocks of cipher text. This is a highly desirable property for encryption of data sent over v/f lines.

In addition to the IV, each poll response is also preceded by an identifier for the remote DEE which is responding. This information makes it possible for the encryptor at the central location to maintain a separate "crypto system" for each remote location. These decryption systems operate in a continuous or constant-carrier mode rather than in an interrupted mode as required for decryption of link data. The previously received encrypted status message blocks serve as the initialization information for decryption of the current block in accordance with the cipher feedback algorithm.

Figure 2:
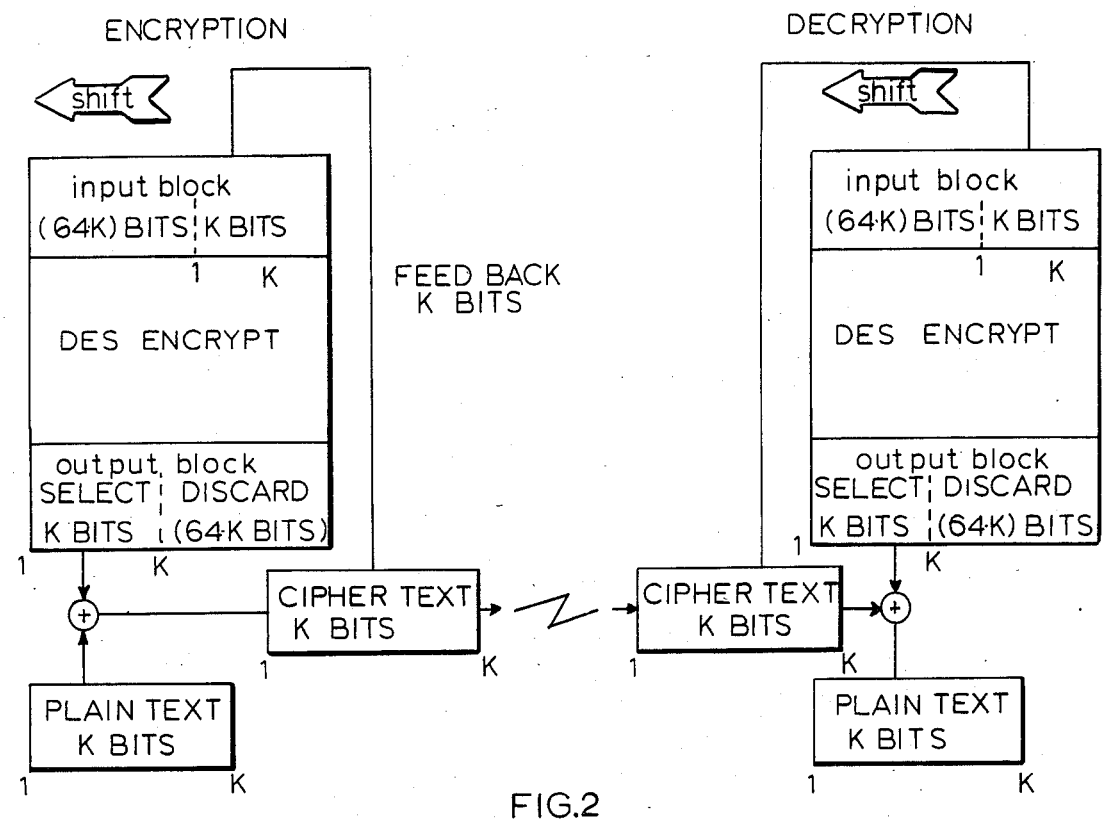
FIG. 2 illustrates the cipher feedback mode encryption algorithm.

The security status messages, which can be of any length and can use any protocol, are periodically prepared by the encryptors located at the remote locations. The messages will generally contain information on the security status of the encryptor itself and of its immediate environment which is obtained from signalling lines connected to the encryptor from building alarms, etc. The messages should also contain a sequencing number or time stamp so that each message is unique even though the alarm status information may be the same as in other messages. Encryption of the status messages is done using K-bits cipher feedback (FIG. 2) where K is the number of bits being used for the IV. This encryption/decryption is performed as follows:

(1) The DES input block contains the most recently transmitted 64 bits of the cipher text produced by encrypting previous status messages or portions of the current status message. The DES ECB algorithm (encrypt mode) is performed on this input block to produce the output block.

(2) The K most significant bits of the output block are added modulo-2 (EXCLUSIVE ORed) with the next K bits of status message to be transmitted.

(3) The resulting output of this addition is the next segment of the encrypted status message to be sent. It will also be used as the initialization vector for encryption of the next frame of data received from the DTE. A single zero value starting bit followed by an identifier for the drop are appended to the beginning of this block of cipher text. This is then transmitted by the encryptor to the DCE after receiving RTS (request to send) line active from the DTE, raising RTS to the DCE, and receiving CTS (clear to send) active from the DCE. Transmission of this data will be immediately followed by the cipher text produced by encryption of data coming from the DTE.

(4) The K-bits of encrypted status message is left-shifted into the input block used for encryption of the status message to produce the inputs block to be used for encryption of the next segment of status message.

(5) At the central site, when reception of this frame has started, the master encryptor will load the DES input block of its DES device with the previously received 64 bits of encrypted status message received from this drop. The DES ECB algorithm (encrypt mode) is performed on this input block to produce the output block. The K-bit received IV block is first saved in a register since it will be needed to decrypt the link data cipher text which follows. This block is then added modulo-2 to the most significant K bits from the output block to produce the plain text of this segment of status message which is sent to the network security monitor console (FIG. 1) over an auxiliary data channel.

(6) The K-bit (status message cipher text) is then left shifted into the input block to form the input block to be used for decryption of the next segment of status. This system is efficient because the data transmission time normally used to send the initialization vector is instead used to transmit the status of the encryption device and its environment. This both eliminates the need for a separate line dedicated to transmitting alarm status and minimizes the degradation to throughput on the main data channel needed to send this information. This system is secure because of the following:

(1) Since the status messages are encrypted in a secret key, it is not possible for the "opponent" to replace alarm messages with forged "All's well" messages.

(2) Since security status messages are expected from each drop at regular intervals, total loss of the communications link (possibly caused by line being removed from service) can be quickly detected.

(3) Since the status messages are encrypted using cipher feedback, the cipher text for each message is different even if the plain text of the messages is exactly the same. This will make it impossible for the "opponent" to deduce the contents of a message based on the frequency and timing of occurrence of this associated cipher text (dictionary attack). This makes it possible to periodically send a sequencing number which does not have to be in every message. The sequencing number makes each chain of status messages unique thereby making it impossible for the opponent to deceive the system by replacing the current status messages containing alarms with a stream of "All's Well" messages which have previously been recorded (playback attack).

Figure 3:
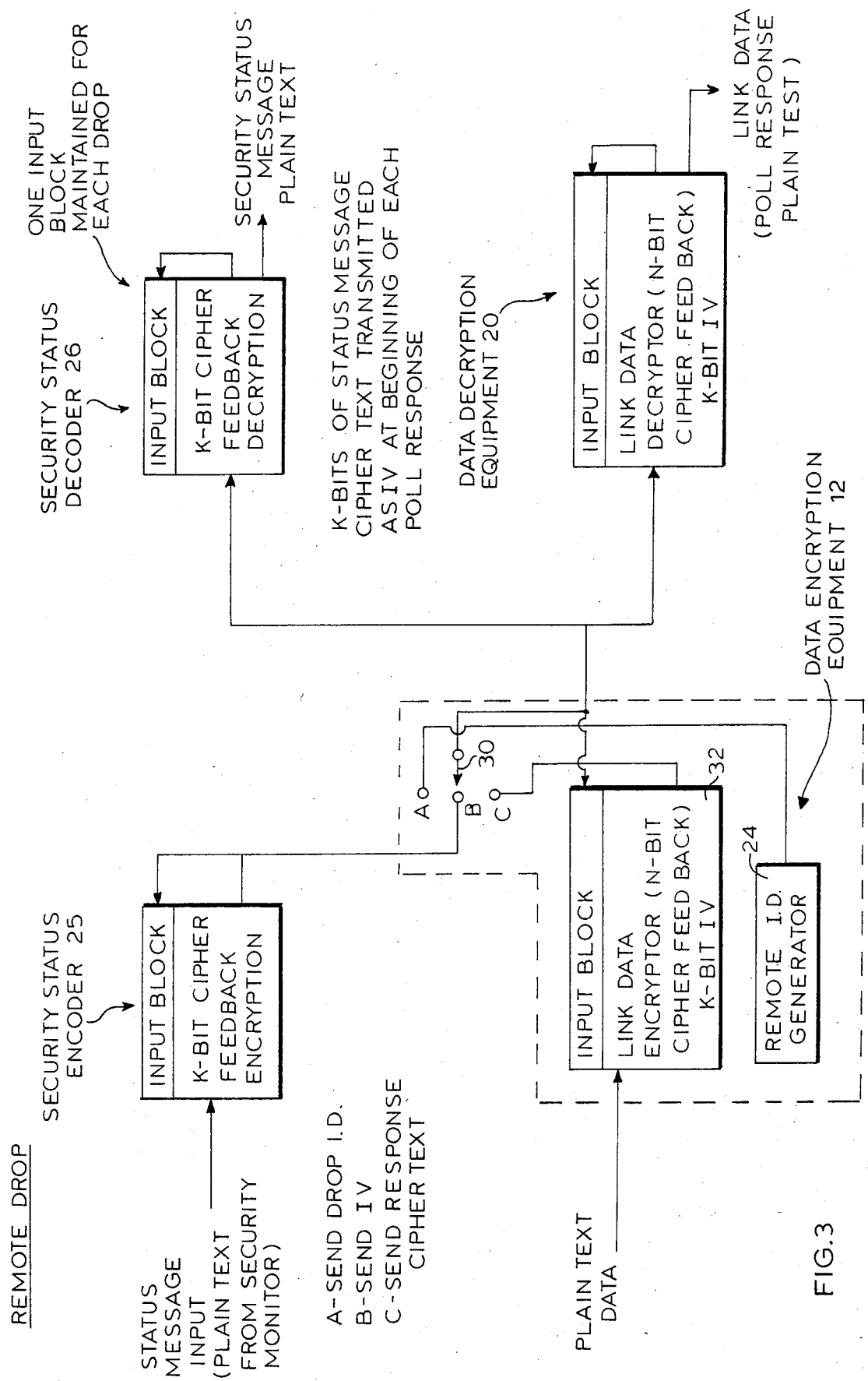
FIG. 3 shows details of the data encryptors at the master and remote locations.

Details of the encryption and decryption equipment are shown in FIG. 3. The security status encoder 25 comprises a DES encryptor operated in the K-bit cipher feedback mode as shown. The DEE 12 comprises an automatic switch 30, a DES encoder 32 and a remote I.D. generator 34.

As previously mentioned, security encoder 25 receives in plain text data indicative of various security devices and in response generates an encrypted message.

Encryptor 32 receives plain text messages from the local DTE and encrypts them using DES in the cipher feedback mode. Remote I.D. generator generates a message used to identify the remote unit.

Figure 4:
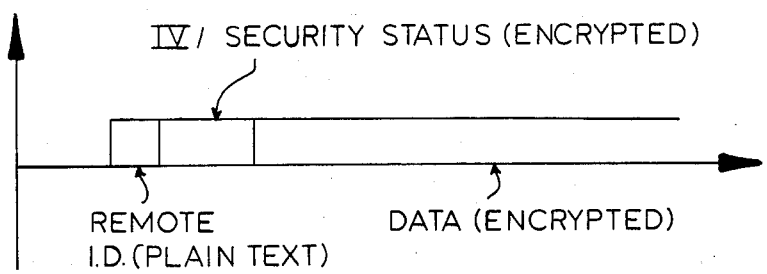
FIG. 4 shows a typical message sent from a remote to the master.

Switch 30 is adapted to transmit in response to a polling request from the master to send in sequence the messages from the data generator 34, status security encoder 25 and data encoder 32 respectively. The data sent to the master is shown in FIG. 4.

At the master the received data is sent to the security status decoder 26 and to data decryption equipment 20. In the security decoder the IV received as part of a header is used to generate a plain text message indicative of the status of the security devices 24. As shown in FIG. 3 decoder 26 comprises a DES encoder operated in the cipher feedback decryption mode. Data decryption equipment 20 also comprises a DES encryption operated in the cipher feedback decryption mode and is used to generate plain text data corresponding to the encrypted received data.

Obviously one skilled in the art could modify the invention without departing from its scope as defined in the appended claim.

What is claimed is:

1. In a system for interchanging messages between a remote terminal at a first location and a master terminal at a second location, said messages being encoded by using the Data Encryption Standard, a method of monitoring the status of security devices disposed at said first location by a display device disposed at said second location comprising:

sensing the status of said security devices at said first location;

generating an initializing vector indicative of said status at said first location;

receiving plain text data from said remote terminal at said first location;

encoding plain text data in accordance with said initializing vector to generate encoded data without adding any data signals indicative of said status to said plain text encoded data;

transmitting the encoded data and said initializing vector from said first to said second location;

receiving said encoded data and said initializing vector at said second location;

decoding the initialization vector to generate a received security message for said display device; and decoding said encoded data in accordance with said initializing vector to generate received plain text data whereby said plain text data contains no information regarding the status of said security devices.

* * * * *